(12) United States Patent
Ozai et al.

(10) Patent No.: US 8,142,698 B2
(45) Date of Patent: Mar. 27, 2012

(54) METHOD FOR REDUCING A SURFACE GLOSSINESS OF AN ORGANOPOLYSILOXANE-CURED ARTICLE

(75) Inventors: Toshiyuki Ozai, Annaka (JP); Mitsuhiro Iwata, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/956,989

(22) Filed: Nov. 30, 2010

(65) Prior Publication Data

US 2011/0071236 A1 Mar. 24, 2011

Related U.S. Application Data

(62) Division of application No. 11/808,082, filed on Jun. 6, 2007, now abandoned.

(30) Foreign Application Priority Data

Jun. 7, 2006 (JP) ................................ 2006-158090

(51) Int. Cl.
*B29C 47/00* (2006.01)
*B28B 1/14* (2006.01)

(52) U.S. Cl. ........ 264/108; 264/299; 524/493; 524/494; 524/588; 428/143; 428/149

(58) Field of Classification Search .................. 264/108, 264/299; 524/493, 494, 588; 428/141, 143, 428/149
See application file for complete search history.

(56) References Cited

U.S. PATENT DOCUMENTS

| | | | |
|---|---|---|---|
| 3,498,945 | A | 3/1970 | Lefort et al. |
| 3,524,794 | A | 8/1970 | Jonnes et al. |
| 4,677,022 | A | 6/1987 | Dejaiffe |
| 5,881,409 | A | 3/1999 | Pearce |
| 5,981,610 | A | 11/1999 | Meguriya et al. |
| 5,998,548 | A | 12/1999 | Brennenstuhl et al. |
| 6,268,432 | B1 | 7/2001 | Nakata et al. |
| 6,274,648 | B1 | 8/2001 | Meguriya et al. |
| 6,297,305 | B1 | 10/2001 | Nakata et al. |
| 6,602,102 | B2 | 8/2003 | Gines et al. |
| 6,770,700 | B2 | 8/2004 | Mueller et al. |

FOREIGN PATENT DOCUMENTS

| | | |
|---|---|---|
| CN | 1733842 A | 8/2005 |
| CN | 1923900 A | 3/2007 |
| JP | 62-27460 A | 2/1987 |
| JP | 6-157910 A | 6/1994 |
| JP | 7-188560 A | 7/1995 |
| JP | 2000-80276 A | 3/2000 |
| JP | 2000-86896 A | 3/2000 |
| JP | 2000-114600 A | 4/2000 |
| JP | 2000-129128 A | 5/2000 |
| JP | 2000-129240 A | 5/2000 |
| JP | 2000-169711 A | 6/2000 |
| JP | 2004-175814 A | 11/2002 |
| JP | 2006-052760 A | 2/2006 |
| JP | 2007-063388 A | 3/2007 |

OTHER PUBLICATIONS

3M Scothchlite Glass Bubbles. K Series. S Series Product Information. Dec. 2003. 3MPerformance Material Division. www.3m.com/microspheres.
Density Expancel, extracted from www.expancel.com (no. date), accessed on Jul. 6, 2009.
Machine translation: JP2004-175814A (Nov. 2002).
MSDS of PMMA from Aug. 25, 2010 and http://fscimage.fisherci.com/msds/21891.htm.
Questions and answers Expancel extracted from www.expancel.com (no date), accessed on Jul. 6, 2009.
Japanese Office Action dated Dec. 22, 2010 for Japanese Application No. 2006-158090.

*Primary Examiner* — Gerard Higgins
(74) *Attorney, Agent, or Firm* — Birch, Stewart, Kolasch & Birch, LLP

(57) ABSTRACT

A method of reducing a surface glossiness of an organopolysiloxane-cured article is provided. The method comprises preparing the liquid organopolysiloxane composition for matting comprising: (A) 100 parts by weight of a thermosetting liquid organopolysiloxane composition having a specific gravity larger than the component (B), and (B) 0.1 to 100 parts by weight of a hollow filler having a melting point of at least 150° C., and a particle size of up to 200 μm, casting the liquid organopolysiloxane composition as a potting material or coating material; and curing the liquid organopolysiloxane composition at a temperature of 10 to 160 C for 30 to 180 minutes, whereby the hollow filler floats to the surface of the organopolysiloxane and forms surface irregularities on the surface of the cured article during curing to provide a surface glossiness of up to 40 in a cured article having a matted surface.

14 Claims, No Drawings

METHOD FOR REDUCING A SURFACE GLOSSINESS OF AN ORGANOPOLYSILOXANE-CURED ARTICLE

CROSS-REFERENCE TO RELATED APPLICATION

This Application is a Divisional of co-pending application Ser. No. 11/808,082, filed on Jun. 6, 2007, now abandoned and for which priority is claimed under 35 U.S.C. §120; and this claims priority to Patent Application No. 2006-158090 filed in Japan on Jun. 7, 2006 under 35 U.S.C. §119(a). The entire contents of all are hereby incorporated by reference.

TECHNICAL FIELD

This invention relates to a flowable liquid organopolysiloxane composition for producing a cured article having a matted surface. This invention also relates to a cured article having a matted surface.

BACKGROUND ART

A liquid organopolysiloxane (silicone rubber) composition which is flowabile at room temperature and which cures by heating or the like has been widely used as a potting material or coating material in various fields such as construction and industry.

An article produced by curing such liquid silicone rubber composition had a smooth and glossy surface, and when such composition is used for sealing, adhesion, or electric insulation of a liquid crystal display (LED), the surface of the cured composition reflects beams from inside and outside the LED. Such reflection resulted in the loss of image contrast which in turn resulted in the poor visibility, and also, in the poor reliability of the detection system receiving the light beam from the LED.

In order to cope with this problem, grinding of the surface of the cured article having a glossy surface was often carried out to thereby roughen the surface with a file. Also contemplated was increase in the luminance of the optical device. However, mechanical surface roughening of the cured article resulted in the increase in the number of steps, which invited increase in the production cost. Use of the optical device with higher luminance also resulted in the increased cost.

Another attempt has been incorporation of an inorganic filler such as pulverized silica or fumed silica having a specific gravity of 2.0 or higher in the liquid silicone rubber composition to thereby provide a cured article having a matted surface. However, incorporation of the inorganic filler at a high content was required in order to provide a sufficiently matted surface by this method, and such incorporation of the inorganic filler at a high content resulted in an increased viscosity of the composition, and hence, in a marked decrease in the flowability. Accordingly, use of such composition as a potting material or coating material was difficult.

Also proposed were use of liquid silicone rubber compositions containing a filler having a large particle size or a fiber-shaped filler for providing a cured article having a matted surface (see JP-A 6-157910 and JP-A 7-188560: Patent Documents 1 and 2).

In the case of these silicone rubber compositions, the filler had a specific gravity higher than that of the silicone rubber used for the base component, and these compositions were associated with the risk of filler separation during the storage. Prevention of such separation required increase in the filler content or increase in the viscosity of the base component, which sacrificed flowability of the composition.

Also proposed are liquid silicone rubber compositions having added thereto a small amount of hydrocarbon compound which is either liquid or solid at room temperature and which has poor compatibility with the silicone rubber (JP-A 2000-169711, JP-A 2000-80276, JP-A 2000-86896 both corresponding to U.S. Pat. No. 6,297,305, JP-A 2000-114600, JP-A 2000-129128, and JP-A 2000-129240 all corresponding to U.S. Pat. No. 6,268,432: Patent Documents 3 to 8). When these compositions are used, the hydrocarbon compound gradually migrates toward the surface of the cured article after the curing to thereby provide the cured article with a matted surface. Since the hydrocarbon is readily dispersible in the silicone rubber used as the base component but hardly separable from the silicon rubber due to the specific gravity of the hydrocarbon which is similar to that of the silicone rubber, the resulting composition will retain the flowability sufficient for its use in the potting application.

These silicone rubber composition, however, had a drawback that formation of the matted surface by the migration of the hydrocarbon to the surface of the cured article required time. Control of the degree of matting was also difficult since the degree of matting differed even if the hydrocarbon content in the composition were the same since migration proceeded at a different rate when surface area of the hydrocarbon per unit volume was different.

Another method known in the art is addition of a greatly excessive amount of a basic silane coupling agent such as γ-aminopropyltriethoxysilane in the composition. In this case, the basic silane coupling agent bleeds out from the surface during the curing of the composition, and production of a cured article having a matted surface is thereby enabled. This method, however, has the drawback that the large amount of silane coupling agent incorporated results in the inferior rubber property of the cured article.

DISCLOSURE OF THE INVENTION

The present invention has been completed for the purpose of overcoming the situation as described above, and an object of the present invention is to provide a liquid organopolysiloxane composition which can readily form a cured article having a matted surface without requiring separate step such as mechanical surface roughening, and which is well adapted for use as a potting material or coating material in an electric or electronic components such as LED. Another object of the invention is to provide an article having a matted surface produced by curing such composition.

In order to realize such objects, the inventors of the present invention made an intensive study and found that a liquid organopolysiloxane composition for matting comprising (A) 100 parts by weight of a thermosetting liquid organopolysiloxane composition, and (B) 0.1 to 100 parts by weight of a hollow filler having a melting point of at least 150° C., a specific gravity of 0.01 to 0.8, and a particle size of up to 200 µm; wherein the composition has a viscosity at room temperature of 100 to 100,000 mPa·s, and the resulting cured article has a surface glossiness of up to 40 is readily capable of forming a cured article having a matted surface without requiring a separate step such as mechanical surface roughening, and such composition is well adapted for use as a potting material or a coating material for an electric or electronic device such as LED. The present invention has been completed on the basis of such finding.

Accordingly, the present invention provides a liquid organopolysiloxane composition for matting and an article cured therefrom having a matted surface as described below.

[1] A liquid organopolysiloxane composition for matting comprising (A) 100 parts by weight of a thermosetting liquid organopolysiloxane composition, and (B) 0.1 to 100 parts by weight of a hollow filler having a melting point of at least 150° C., a specific gravity of 0.01 to 0.8, and a particle size of up to 200 μm; wherein the composition has a viscosity at room temperature of 100 to 100,000 mPa·s, and the resulting cured article has a surface glossiness of up to 40.

[2] The liquid organopolysiloxane composition for matting according to the above [1] wherein the thermosetting liquid organopolysiloxane composition of the component (A) is a liquid organopolysiloxane composition which cures by addition reaction.

[3] The liquid organopolysiloxane composition for matting according to the above [1] or [2] wherein the hollow filler of the component (B) has an outer shell of borosilicate glass.

[4] An article having a matted surface with a surface glossiness of up to 40 produced by curing the liquid organopolysiloxane composition for matting of any one of the above [1] to [3].

[5] A method of reducing a surface glossiness of an organopolysiloxane-cured article comprising preparing the liquid organopolysiloxane composition of [1], [2] or [3] and curing the liquid organopolysiloxane to obtain a cured article having a matted surface.

[6] The method of [5] wherein the liquid organopolysiloxane composition is cured at a temperature of 10 to 160° C.

EFFECTS OF THE INVENTION

The liquid organopolysiloxane composition for matting of the present invention is readily capable of providing a cured article having a matted surface without additionally conducting a separate step such as mechanical surface roughening by using a file.

Accordingly, use of such organopolysiloxane composition as a potting or coating material in an image display such as LED will obviate the problems of reduced contrast due to reflection of the incident light beam on the surface of the cured article as well as loss of reliability of the detection system.

DESCRIPTION OF THE PREFERRED EMBODIMENTS

The liquid organopolysiloxane composition for matting of the present invention comprises (A) a thermosetting liquid organopolysiloxane composition, and (B) a hollow filler having a melting point of at least 150° C., a specific gravity of 0.01 to 0.8, a particle size of up to 200 μm.

The thermosetting liquid organopolysiloxane used in the present invention as component (A) is not particularly limited for its type or mode of curing as long as it is liquid at room temperature (25° C.), and cures by heating to form a cured article having rubber elasticity.

Exemplary such organopolysiloxane compositions include liquid silicone rubber compositions which cure by an addition reaction comprising an alkenyl group-containing organopolysiloxane, an organohydrogen polysiloxane containing hydrogen atoms bonded to the silicon atom, and a reinforcing filler, and which cures by platinum-based catalyst to form silicone rubber; liquid silicone rubber compositions which cure by organic peroxide comprising an alkenyl group-containing organopolysiloxane and a reinforcing filler which cures by organic peroxide to form a silicone rubber; and liquid silicone rubber compositions which cure by a condensation reaction comprising a hydroxyl group-containing organopolysiloxane, an organohydrogen polysiloxane containing hydrogen atoms bonded to the silicon atom, and a reinforcing filler which cures by a condensation-promoting catalyst such as an organotin compound or an organotitanium compound. Among these, the preferred are the liquid silicone rubber compositions which cure by an addition reaction in view of the high curing speed and consistent curing.

Such liquid silicone rubber (organopolysiloxane) compositions which cure by an addition reaction is typically a liquid silicone rubber composition comprising (a) a organopolysiloxane having at least two alkenyl groups in one molecule, (b) an organohydrogen polysiloxane having at least two hydrogen atoms bonded to the silicon atom in one molecule, and (c) a platinum-based catalyst.

More specifically, the organopolysiloxane used for the component (a) in this composition is the main ingredient (base polymer) of this composition, and contains at least two alkenyl groups bonded to the silicon atom in one molecule.

Exemplary such alkenyl groups include lower alkenyl groups typically containing 2 to about 6 carbon atoms such as vinyl group, allyl group, and propenyl group. The position of the alkenyl group bonding to the silicon atom in the component (A) (namely, the position of the silicon atom having an alkenyl group bonded thereto in the siloxane skeleton) is, for example, end of the molecular chain and/or side chain of the molecular chain (the molecular chain between opposite ends of the chain).

Content of the alkenyl group in the component (a) is preferably about 0.001 to 10% by mole, and in particular about 0.01 to 5% by mole in relation to all monovalent organic groups (or unsubstituted or substituted monovalent hydrocarbon groups) bonded to the silicon atom.

Examples of the organic group other than the alkenyl group include unsubstituted or substituted monovalent hydrocarbon groups typically containing 1 to about 10 carbon atoms, and preferably containing 1 to about 8 carbon atoms such as alkyl groups such as methyl group, ethyl group, and propyl group; aryl groups such as phenyl group and tolyl group; aralkyl groups such as benzyl group; and halogen-substituted alkyl groups such as 3,3,3-trifluoropropyl group and 3-chloropropyl group.

The component (a) may have a straight chain or a branched molecular structure. The component (a), however, is typically a straight chain dipolydiorganosiloxane having the backbone comprising a repetition of diorganosiloxane units having opposite ends endcapped with a triorganosiloxy group. While the component (a) is not particularly limited for its molecular weight, the molecular weight is preferably such that the resulting composition has a viscosity at 25° C. in the range of 10 to 100,000 mPa·s. In the present invention, two or more organopolysiloxanes may also be used in combination.

In the present invention, the viscosity may be measured by a viscometer such as a rotational viscometer.

The organohydrogen polysiloxane of the component (b) is a component which contributes for the crosslinking of the component (a) as described above. More specifically, the crosslinking and curing proceeds by the addition reaction in which the hydrogen atoms bonded to the silicon atom (namely, a hydrosilyl group represented by the formula SiH) of the component (b) reacts with the alkenyl group bonded to the silicon atom of the component (a) in the presence of the platinum-based catalyst of the component (c). At least two hydrogen atoms bonded to the silicon atom should be present in one molecule.

The hydrogen atom bonded to the silicon atom in the organohydrogen polysiloxane may be either the one bonded to the silicon atom at the end of the molecular chain or the one bonded to the silicon atom between opposite ends of the molecular chain, and hydrogen atoms of both types may be included in one molecule. At least two such hydrogen atoms (typically 2 to 200 hydrogen atoms), and preferably, at least three hydrogen atoms (for example, 3 to 100 hydrogen atoms) are included in one molecule.

As in the case of the unsubstituted or substituted monovalent hydrocarbon group except for the alkenyl group or the like containing an aliphatic unsaturated bond of component (a), exemplary organic groups other than the hydrogen atom bonded to the silicon atom include alkyl groups such as methyl group, ethyl group, and propyl group; aryl groups such as phenyl group and tolyl group; aralkyl groups such as benzyl group; halogen-substituted alkyl groups such as 3,3, 3-trifluoropropyl group and 3-chloropropyl group.

The component (b) may have any of straight chain molecular structure including the straight and branched structure, cyclic molecular structure, branched molecular structure, and three-dimensional network molecular structure. While the component (b) is not particularly limited for its molecular weight, the molecular weight is preferably such that the resulting composition has a viscosity at 25° C. in the range of 0.5 to 10,000 mPa·s, and in particular, 1 to 5,000 mPa·s. Number of the silicon atoms in one molecule (namely, degree of polymerization) is typically 2 to about 300, and preferably 3 to about 150.

Examples of the organohydrogen polysiloxane of component (b) include 1,1,3,3-tetramethyldisiloxane, 1,3,5,7-tetramethylcyclotetrasiloxane, tris(hydrogen dimethylsiloxy) methylsilane, tris(hydrogen dimethylsiloxy) phenyl silane, methyl hydrogen cyclopolysiloxane, a cyclic copolymer of methyl hydrogen siloxane and dimethyl siloxane, methyl hydrogen polysiloxane having both ends endcapped with trimethylsiloxy group, a copolymer of dimethyl siloxane having both ends endcapped with trimethylsiloxy group and methyl hydrogen siloxane, dimethylpolysiloxane having both ends endcapped with dimethyl hydrogen siloxy group, a copolymer of dimethyl siloxane having both ends endcapped with dimethyl hydrogen siloxy group and methyl hydrogen siloxane copolymer, a copolymer of methyl hydrogen siloxane having both ends endcapped with trimethylsiloxy group and diphenyl siloxane, a copolymer of methyl hydrogen siloxane having both ends endcapped with trimethylsiloxy group, diphenyl siloxane, and dimethyl siloxane, a copolymer of methyl hydrogen siloxane having both ends endcapped with trimethylsiloxy group, methyl phenyl siloxane, and dimethyl siloxane, a copolymer of methyl hydrogen siloxane having both ends endcapped with dimethyl hydrogen siloxy group, dimethyl siloxane, and diphenyl siloxane, a copolymer of methyl hydrogen siloxane having both ends endcapped with dimethyl hydrogen siloxy group, dimethyl siloxane, and methyl phenyl siloxane, a copolymer comprising $(CH_3)_2HSiO_{1/2}$ unit, $(CH_3)_3SiO_{1/2}$ unit, and $SiO_{4/2}$ unit, a copolymer comprising $(CH_3)_2HSiO_{1/2}$ unit and $SiO_{4/2}$ unit, a copolymer comprising $(CH_3)_2HSiO_{1/2}$ unit, $SiO_{4/2}$ unit, and $(C_6H_5)_3SiO_{1/2}$ unit.

The component (b) is preferably incorporated such that the molar ratio of the hydrogen atom bonded to the silicon atom in the component (b) to the alkenyl group bonded to the silicon atom in the component (a) (hydrogen atom bonded to the silicon atom: alkenyl group bonded to the silicon atom) is in the range of (0.5:1) to (20:1), and more preferably (1:1) to (5:1). A molar ratio of less than 0.5 may result in an insufficient curability, and also, in the failure of realizing the excellent mechanical strength, whereas a molar ratio in excess of 20 may invite a drastic loss of heat resistance.

The platinum-based catalyst of component (c) is a catalyst used for curing the organopolysiloxane composition, and exemplary platinum-based catalysts include fine platinum powder, platinum black, chloroplatinic acid, platinum tetrachloride, olefin complex of chloroplatinic acid, alcohol solution of chloroplatinic acid, a complex compound of chloroplatinic acid and an alkenyl siloxane, rhodium compound, and palladium compound.

The platinum-based catalyst is preferably added at an amount of 1 to 500 ppm by weight in terms of the platinum metal in relation to the organopolysiloxane of component (a). Most preferably, the platinum-based catalyst is added at 1 to 500 ppm. The addition reaction may be insufficient when the amount of the platinum-based catalyst added is less than 0.1 ppm, whereas an addition in excess of 1,000 ppm may prove economically disadvantageous due to saturation of the reaction promotion effect.

The liquid organopolysiloxane composition of the component (A) may have a known formulation, and a commercially available product may be used as long as the composition does not contain a hollow filler. The liquid organopolysiloxane composition of the component (A) may have a specific gravity as measured by areometer in excess of 0.8, typically 0.85 to 1.2, and most preferably 0.9 to 1.1.

The hollow filler of the component (B) used in the present invention is the component characteristic to the liquid organopolysiloxane composition for matting of the present invention. The hollow filler should have a specific gravity which is smaller than the organopolysiloxane and a melting point of at least 150° C.

As mentioned above, the hollow filler should have a melting point of at least 150° C. The melting point is typically 150 to 1,200° C., and preferably 300 to 1,000° C. When the melting point is less than 150° C., production of a composition realizing a sufficient strength is difficult due to the melting of the filler during the heating of the composition.

The hollow filler may typically have a specific gravity (true specific gravity) of 0.01 to 0.8, preferably 0.1 to 0.7, and more preferably 0.2 to 0.6. When the specific gravity is less than 0.01, mixing of the filler with the organopolysiloxane is difficult, and the effect of matting is not realized when the specific gravity is in excess of 0.8 since the specific gravity of the filler is similar to that of the organopolysiloxane.

The hollow filler used in the present invention may have a particle size (an average particle size) of up to 200 μm (typically 0.1 to 200 μm), preferably 1 to 150 μm, and more preferably 10 to 100 μm. Commercial production of a hollow filler having a particle size of less than 0.1 μm is difficult, and therefore, costly. On the other hand, use of a hollow filler having a particle size in excess of 200 μm results in the drastic loss of the mechanical strength (rubber properties) of the composition. In the present invention, the particle size is determined as cumulative weight average $D_{50}$ (or median diameter) or the like in particle distribution measurement using laser diffractometry.

The hollow filler may be filled in its interior with a volatile substance such as volatile solvent or gas. Examples of such volatile substance include low molecular weight hydrocarbons such as butane, isobutane, and n-pentane.

The hollow filler is preferably the one having the outer shell comprising a glass or a high melting resin. Exemplary glasses include borosilicate glass and silicon dioxide, and exemplary thermoplastic resins include polycarbonate, polyimide, polyacrylonitrile, and copolymers of two or more such resins. Among these, the preferred is the hollow fiber having a borosilicate glass outer shell in view of its reinforcing ability and handling convenience.

The hollow filler used may be a commercially available product. Exemplary such products include CEL-STAR Z series such as CEL-STAR Z-27, Z-36, Z-39, Z-42, and Z-45 manufactured by Tokai Kogyo Co., Ltd. having an outer shell of borosilicate glass, a particle size of 25 to 70 µm, and a specific gravity of 0.25 to 0.75; Scotchlite Glass Bubbles K series, S series, and B series manufactured by 3M having an outer shell of borosilicate glass, a particle size of up to 75 µm, and a specific gravity of 0.12 to 0.60; Expancel DE series manufactured by Expancel having an outer shell of vinylidene chloride-acrylonitrile copolymer resin, a particle size of 10 to 100 µm, and a specific gravity of 0.03 to 0.06; Fillite manufactured by Fillite Co., Ltd. having an outer shell of aluminosilicate, a particle size of 5 to 150 µm, and a specific gravity of 0.5 to 0.8; Microsphere F series manufactured by Matsumoto Yushi-Seiyaku Co., Ltd. having an outer shell of vinylidene chloride-acrylonitrile copolymer resin having a particle size of 10 to 100 µm and a specific gravity 0.03 to 0.06.

The hollow filler of the component (B) may be incorporated at an amount of 0.1 to 100 parts by weight, and more preferably at 1 to 20 parts by weight in relation to 100 parts by weight of the liquid organopolysiloxane composition of the component (A). When the amount of the hollow filler incorporated is less than 0.1 parts by weight, the matting effect will be insufficient. When the amount incorporated is in excess of 100 parts by weight, the matting effect will not be improved in proportion to the amount of the hollow filler incorporated and loss of the mechanical properties and heat resistance will exceed the improvement realized by the addition of the hollow filler.

The liquid organopolysiloxane composition for matting of the present invention may also contain other components such as inorganic fillers such as fumed silica, precipitated silica, pulverized quarts, titanium oxide, iron oxide, calcium carbonate, and magnesium carbonate; pigments such as carbon black and iron red; and other additives such as heat resistance improver, reaction controlling agent, mold release agent, plasticizer, sensitizer, polymerization inhibitor, and adhesion improver at an adequate amount that will not adversely affect the benefits of the present invention.

The liquid organopolysiloxane composition for matting of the present invention can be produced by homogeneously mixing or kneading the components (A) and (B) together with optionally incorporated additives.

The resulting liquid organopolysiloxane composition for matting has a viscosity at room temperature (25° C.) of 100 to 100,000 mPa·s, preferably 200 to 50,000 mPa·s, and more preferably 300 to 10,000 mPa·s. When the polysiloxane composition of the present invention has a viscosity of less than 100 mPa·s, sufficient mechanical strength (strength, elongation, hardness) will not be obtained. When the viscosity is in excess of 100,000 mPa·s, use of the composition as a potting material or coating material will be difficult due to the poor flowability which results in the difficulty of filling minute spaces as well as poor self leveling property which results in the surface inconsistency and insufficient degree of matting.

The liquid organopolysiloxane composition for matting of the present invention is well adapted for use as a potting material or a coating material for filling or adhesion purpose in a display device such as LED since it has sufficient flowability at room temperature, and since the composition is also capable of forming a cured article with matted surface by curing, and in particular, by curing with heat.

In the liquid organopolysiloxane composition for matting of the present invention, the hollow filler incorporated as the component (B) having a lighter specific gravity than the organopolysiloxane forms surface irregularities on the surface of the cured article in the course of the curing step, and in particular, in the course of the curing by heating, and the minute surface irregularities are thereby formed.

As described above, the liquid organopolysiloxane composition for matting of the present invention is capable of providing a cured article having a matted surface without carrying out an additional step such as mechanical surface roughening, thereby solving the problems of decrease in the contrast due to reflection of incident light beam on the surface of the cured article or poor reliability of the detection system.

The temperature to which the liquid organopolysiloxane composition for matting of the present invention is heated for curing of the composition is preferably adjusted depending on the floating of the hollow filler to the surface of the polysiloxane. Use of an excessively low temperature for the heating and curing is associated with the risk of the curing failure of the material. On the other hand, use of an excessively high temperature for the heating and curing is associated with the risk of curing of the composition before the floating of the hollow filler. Although the temperature used for the heating and curing should be confirmed for each composition because such temperature differs by the viscosity of the composition as well as the hollow filler concentration, and temperature is typically in the range of 10 to 160° C., and in preferably, in the range 50 to 90° C. The curing time is typically 30 to 180 minutes, and preferably 60 to 120 minutes. While the cured article of the present invention does not require post curing (secondary curing), such post curing may be conducted as desired.

The thus produced cured article has a matted surface with a glossiness of up to 40 (namely, 0 to 40), preferably 1 to 35, and more preferably 5 to 30. An excessively high surface glossiness results in glossy appearance of the cured article, and such article can not be used for the application where a matted surface is required. The surface glossiness can be measured with a glossmeter.

EXAMPLES

Next, the present invention is described in further detail by referring to Example and Comparative Examples which by no means limit the scope of the present invention. In the present invention, parts and % designate parts by weight and % by weight, respectively. Particle size of the commercially available hollow filler is the one indicated in the catalog of the manufacturer, and the viscosity is the value measured with a rotational viscometer at 25° C.

Example 1

50 parts of KE1280(A) (product name; manufactured by Shin-Etsu Chemical Co., Ltd.; viscosity, 1,500 mPa·s) and 50 parts of KE1280(B) (product name; manufactured by Shin-Etsu Chemical Co., Ltd.; viscosity, 1,000 mPa·s) respectively having the formulation as shown below were mixed to produce a liquid organopolysiloxane composition. This composition had a viscosity of 1,300 mPa·s.

[KE1280(A)]
Base polymer (vinyl group-containing dimethylpolysiloxane): 90%,

Platinum catalyst: 0.01%,
Fumed silica: 5.0%,
Other additives: 4.99%

[KE1280(B)]

Base polymer (vinyl group-containing dimethylpolysiloxane): 75%
Methyl hydrogen polysiloxane: 10.0%,
Fumed silica: 5.0%,
Other additives: 10.0%

Next, to this liquid organopolysiloxane composition was added 6 parts of CEL-STAR Z-36 (product name of a hollow filler manufactured by Tokai Kogyo Co., Ltd. having an outer shell of borosilicate glass, a particle size of 25 to 70 μm, and a specific gravity of 0.25 to 0.75, and the mixture was stirred until the mixture became homogeneous to thereby produce a curable organopolysiloxane composition. This organopolysiloxane composition had a viscosity of 2,000 mPa·s.

1 g of the thus obtained organopolysiloxane composition was cast in a polytetrafluoroethylene mold having a length of 50 mm, a width of 50 mm and a depth of 2 mm, and cured by heating to a temperature of 80° C. for 120 minutes using a hot air circulating dryer. The cured article had a surface with fine irregularities. The cured article was measured for its glossiness by GLOSS CHECKER IG-310 manufactured by Horiba Ltd. The article had a glossiness of 20.

Comparative Example 1

A curable organopolysiloxane composition was produced by mixing 50 parts of KE1280(A) and 50 parts of KE1280(B), and this composition was cast in a polytetrafluoroethylene mold as in the case of Example 1 to thereby produce a cured article.

Comparative Example 2

A curable organopolysiloxane composition was produced by adding 6 parts of the hollow filler as described above to 100 parts of KE1825 (product name; manufactured by Shin-Etsu Chemical Co., Ltd.; viscosity, 500,000 mPa·s) having the formulation as shown below, and this composition was cast in a polytetrafluoroethylene mold as in the case of Example 1 to thereby produce a cured article. This composition had a viscosity of 520,000 mPa·s.

[KE1825]

Base polymer (vinyl group-containing dimethylpolysiloxane): 85%,
Methyl hydrogen polysiloxane: 5.0%,
Fumed silica: 9.0%,
Other additives: 1.0%

The cured articles produced by the Example and the Comparative Example were evaluated by visual inspection for surface consistency and surface glossiness. The measurement of the glossiness was conducted according to JIS Z-8741 by measuring 60° specular glossiness using a glossmeter IG-310 (manufactured by Horiba Ltd.)

TABLE 1

|  | Example 1 | Comparative Example 1 | Comparative Example 2 |
| --- | --- | --- | --- |
| Surface of the cured article | Consistent | Consistent | Inconsistent |
| Glossiness | 20 | 70 | 40 to 60 |

As evident from the results as described above, in the case of Example 1, the hollow filler formed surface irregularities with the size in the order of microns before the curing of the organopolysiloxane which is the base component, and as a consequence, the surface of the cured article exhibited reduced glossiness and matte finish.

In contrast, in the case of Comparative Example 1 having no hollow microbodies blended therewith, the surface of the cured article was smooth with high glossiness (specular glossiness), and the effect of matte finishing was not achieved. In the case of Comparative Example 2, the surface of the cured article was inconsistent due to the absence of the self-leveling property, and the glossiness was also inconsistent due to the lack of the floating of the hollow filler.

Japanese Patent Application No. 2006-158090 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of reducing a surface glossiness of an organopolysiloxane-cured article comprising:
   preparing a liquid organopolysiloxane composition for matting comprising:
   (A) 100 parts by weight of a thermosetting liquid organopolysiloxane composition having a specific gravity of 0.85 to 1.2, and
   (B) 0.1 to 100 parts by weight of a hollow filler having a melting point of at least 150° C., a specific gravity of 0.01 to 0.8, and a particle size of up to 200 μm, said liquid organopolysiloxane composition has a viscosity at room temperature of 100 to 100,000 mPa·s;
   casting said liquid organopolysiloxane composition as a potting material; and
   curing said liquid organopolysiloxane composition at a temperature of 10 to 160° C. for 30 to 180 minutes, whereby the hollow filler incorporated as the component (B) having a lighter specific gravity than the organopolysiloxane composition floats to the surface of the organopolysiloxane composition and forms surface irregularities on the surface of the cured article in the course of the curing step to provide a surface glossiness of up to 40 in the cured article having a matted surface.

2. The method of claim 1, wherein the thermosetting liquid organopolysiloxane composition of the component (A) is a liquid organopolysiloxane composition which cures by addition reaction.

3. The method of claim 1, wherein the hollow filler of the component (B) has an outer shell of borosilicate glass.

4. The method of claim 1, wherein the hollow filler of the component (B) has an outer shell of a glass.

5. The method of claim 1, wherein the melting point of the component (B) is 150 to 1200° C.

6. The method of claim 5, wherein the melting point of the component (B) is 300 to 1000° C.

7. The method of claim 1, wherein the liquid organosiloxane composition includes 1 to 20 parts by weight the component (B) with respect to 100 parts by weight of the component (A).

8. A method of reducing a surface glossiness of an organopolysiloxane-cured article comprising:
   preparing a liquid organopolysiloxane composition for matting consisting essentially of:
   (A) 100 parts by weight of a thermosetting liquid organopolysiloxane composition having a specific gravity of 0.85 to 1.2, (B) 0.1 to 100 parts by weight of a hollow filler having a melting point of at least 150° C., a specific gravity of 0.01 to 0.8, and a particle size of up to 200 μm, said liquid organopolysiloxane composition has a viscosity at room temperature of 100 to 100,000 mPa·s, (C) inorganic fillers other than the component (B), and (D) at least one additives selected from the group consisting of heat resistance improver, reaction controlling agent, mold release agent, plasticizer, sensitizer, polymerization inhibitor and adhesion improver;

casting said liquid organopolysiloxane composition as a potting material; and curing said liquid organopolysiloxane composition at a temperature of 10 to 160° C. for 30 to 180 minutes, whereby the hollow filler incorporated as the component (B) having a lighter specific gravity than the organopolysiloxane composition floats to the surface of the organopolysiloxane composition and forms surface irregularities on the surface of the cured article in the course of the curing step to provide a surface glossiness of up to 40 in the cured article having a matted surface.

9. The method of claim 8, wherein the thermosetting liquid organopolysiloxane composition of the component (A) is a liquid organopolysiloxane composition which cures by addition reaction.

10. The method of claim 8, wherein the hollow filler of the component (B) has an outer shell of borosilicate glass.

11. The method of claim 8, wherein the hollow filler of the component (B) has an outer shell of a glass.

12. The method of claim 8, wherein the melting point of the component (B) is 150 to 1200° C.

13. The method of claim 12, wherein the melting point of the component (B) is 300 to 1000° C.

14. The method of claim 8, wherein the liquid organosiloxane composition includes 1 to 20 parts by weight the component (B) with respect to 100 parts by weight of the component (A).

* * * * *